No. 694,222. Patented Feb. 25, 1902.
F. WERTENBRUCH.
WEIGHING MACHINE.
(Application filed Nov. 26, 1901.)
(No Model.) 4 Sheets—Sheet 1.
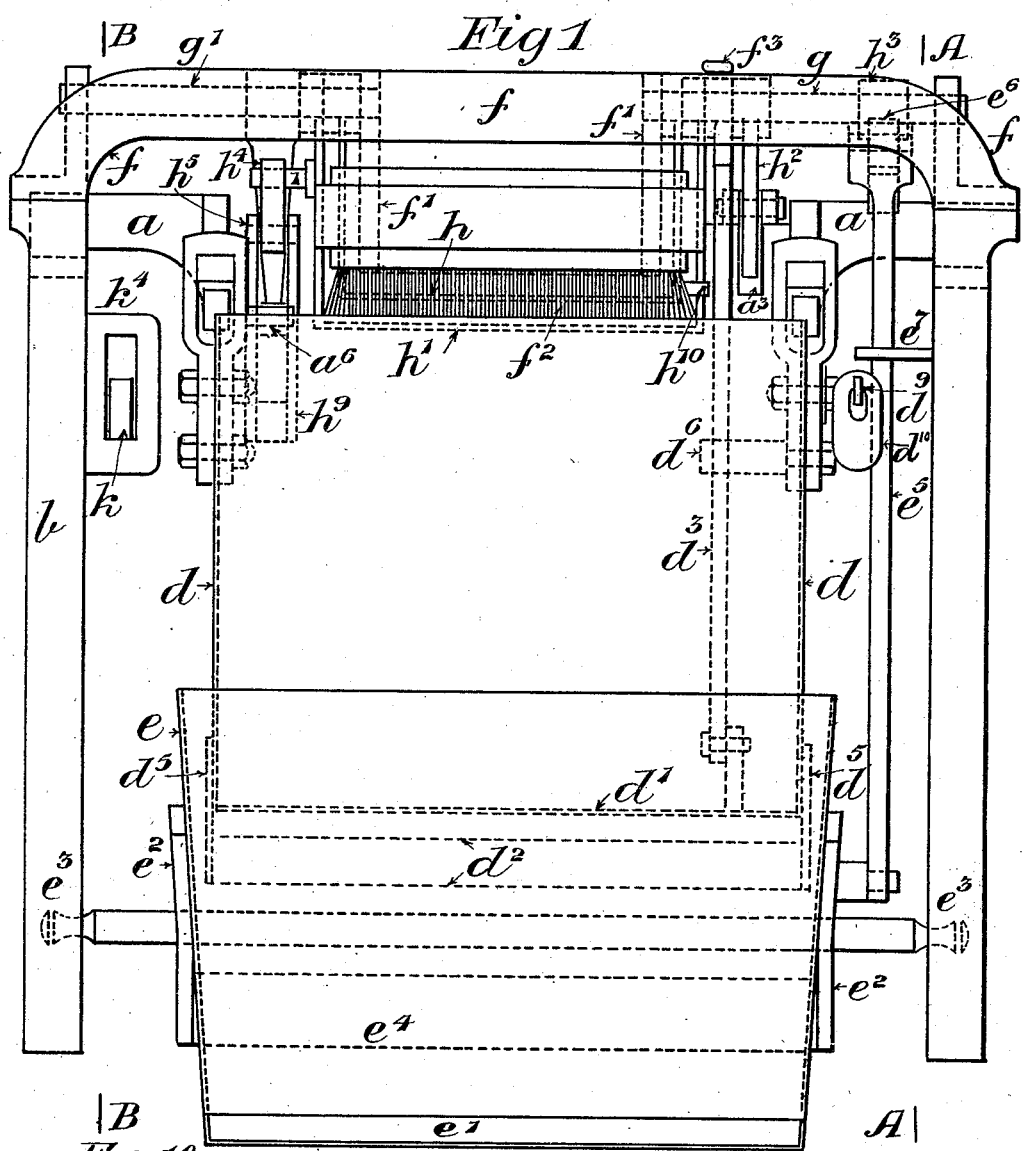
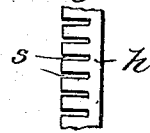
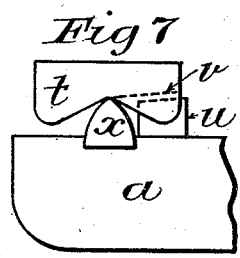
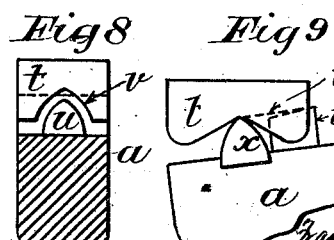
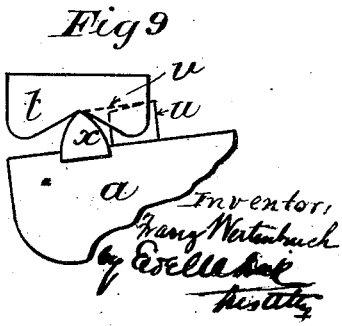

No. 694,222. Patented Feb. 25, 1902.
F. WERTENBRUCH.
WEIGHING MACHINE.
(Application filed Nov. 26, 1901.)
(No Model.) 4 Sheets—Sheet 2.

UNITED STATES PATENT OFFICE.

FRANZ WERTENBRUCH, OF GLASGOW, SCOTLAND.

WEIGHING-MACHINE.

SPECIFICATION forming part of Letters Patent No. 694,222, dated February 25, 1902.

Application filed November 26, 1901. Serial No. 83,708. (No model.)

*To all whom it may concern:*

Be it known that I, FRANZ WERTENBRUCH, a subject of the Emperor of Germany, residing at 161 Pollock street, Paisley road, Glasgow, in the county of Lanark, Scotland, have invented new and useful Improvements in Weighing-Machines, of which the following is a specification.

This invention relates to improvements in machines for automatically weighing cereals, powdered substances, and other similar materials, and has reference to improvements in machines which automatically weigh, deliver, and restart when used for weighing material in bulk and which will weigh and deliver into sacks when required, the said invention having for its object improvements in the machine whereby great accuracy in the weighing is insured and improvements in the general arrangement and construction of the machine.

Figure 2:
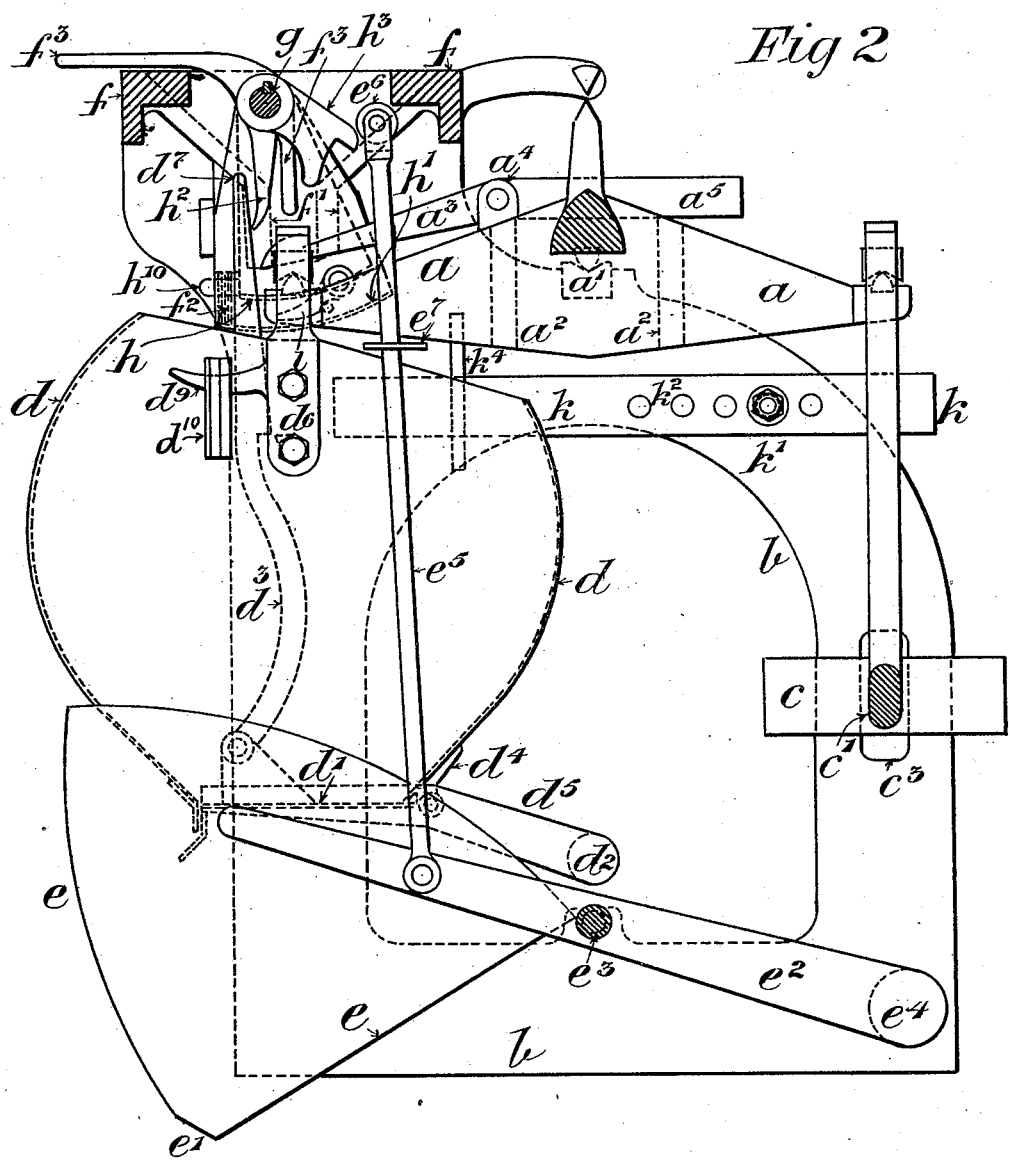
Figure 3:
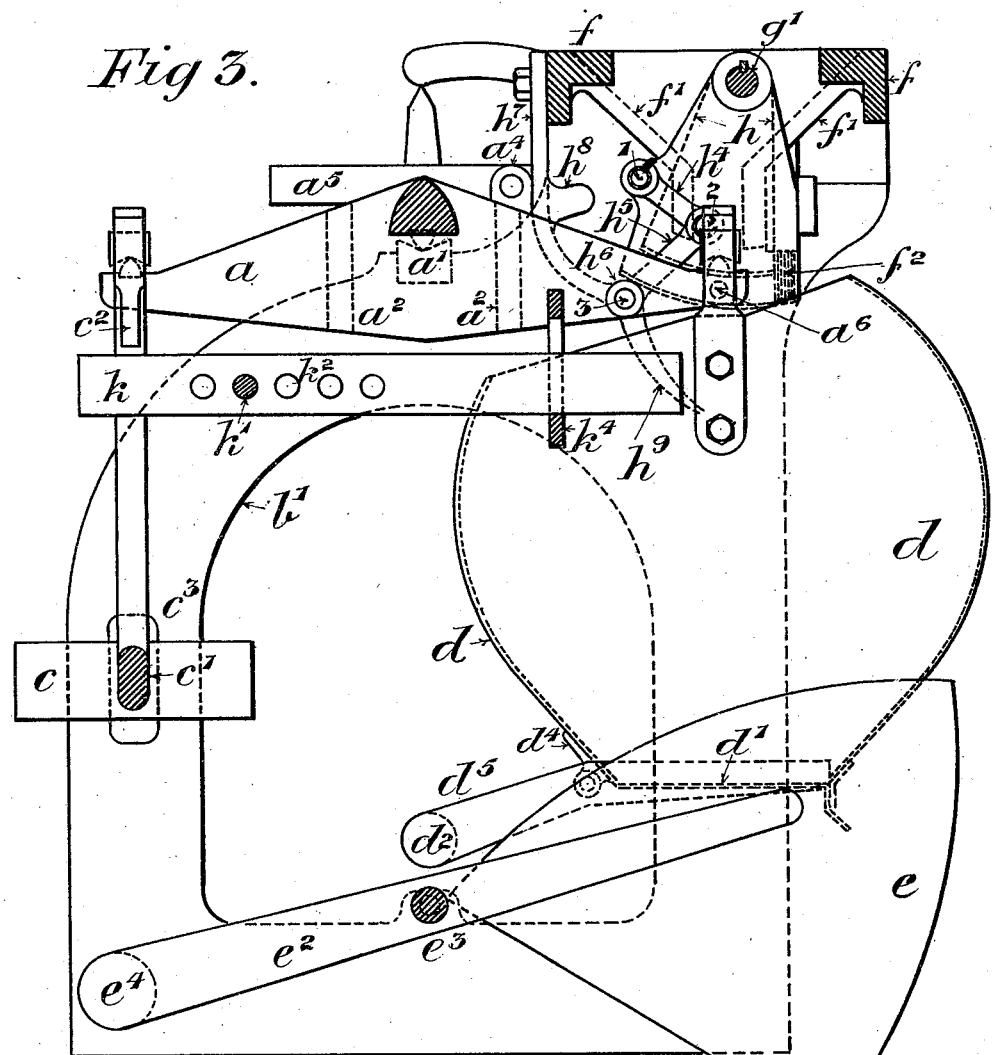
Figures 5, 6:
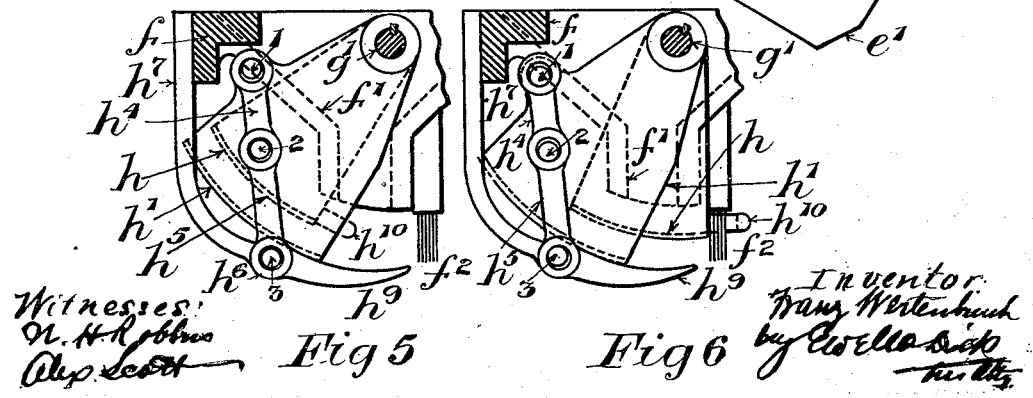
Figure 4:
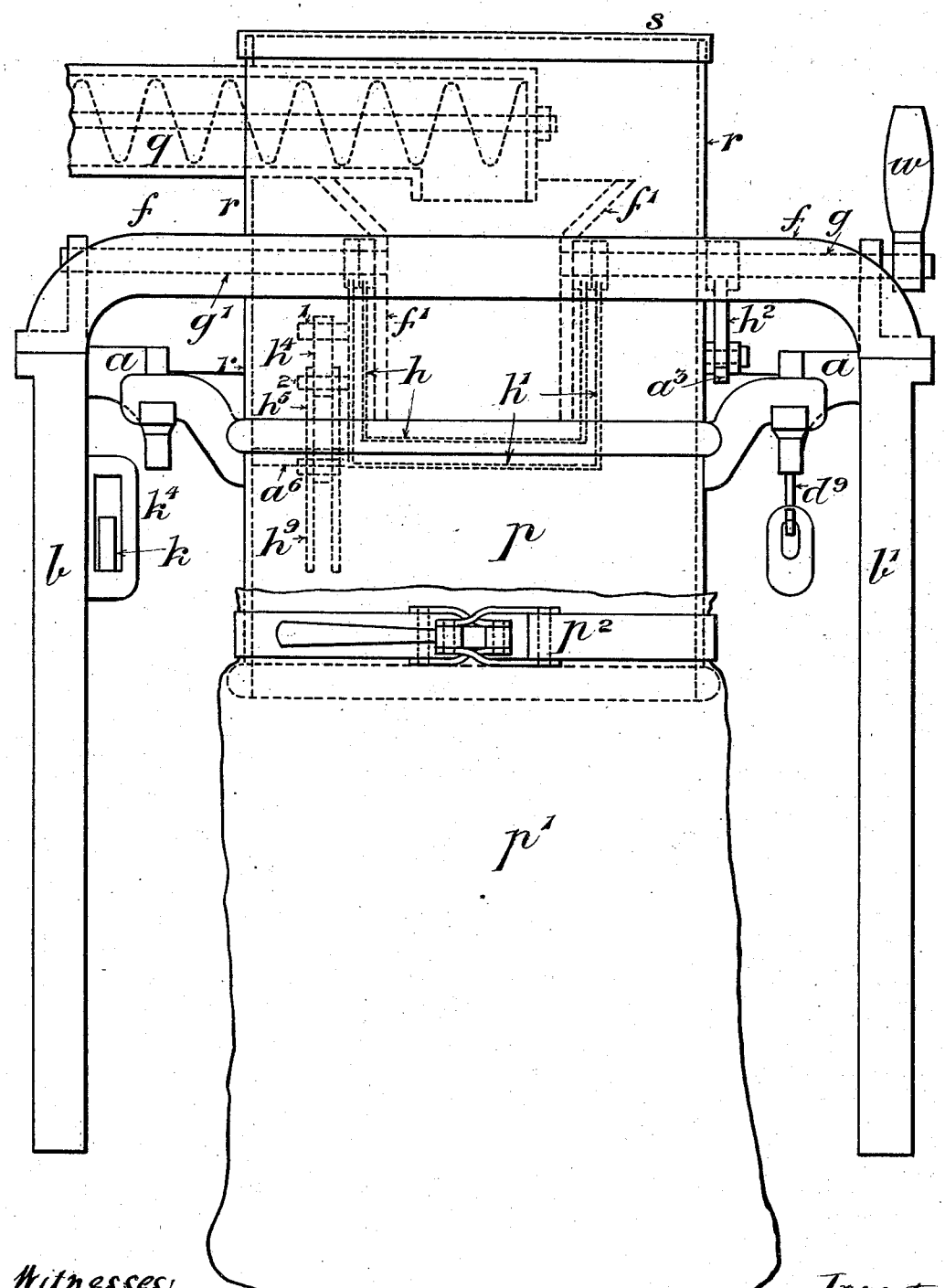

In the drawings which are attached hereto and are referred to in the following detailed description, Figure 1 is a front elevation of a machine for automatically weighing, delivering, and restarting. Fig. 2 is a sectional elevation on the line A A, Fig. 1. Fig. 3 is a sectional elevation on the line B B, Fig. 1. Fig. 4 is a front elevation of the machine as arranged for weighing and delivering into sacks, showing also means for preventing the escape of dust. Fig. 5 is an elevation of the outer-shutter mechanism with both shutters open. Fig. 6 is an elevation of the outer-shutter mechanism with the inner shutter closed. Fig. 7 is a side elevation of the beam end with the beam on the balance, showing the beam-centers. Fig. 8 is an end elevation of the same, and Fig. 9 is a side elevation of the same with the beam in one of its extreme positions of movement. Fig. 10 is a detail view of a portion of the inner shutter, showing the openings in the latter.

In the machine for automatically weighing, delivering, and restarting, as shown in Figs. 1, 2, and 3, the equal-armed beam $a$, fitted with centers of the kind hereinafter described, is centered at $a'$ on the standards $b$ and $b'$ and at the back end is provided with a pivoted weight-pan $c$ and at the front end with a pivoted receiver $d$. The beam has two side arms which are connected by cross-bars $a^2$, and the vertical movement of the weight-pan $c$ is limited during the weighing by projecting lugs $c'$, which work freely in slots $c^3$ in the standards. The bottom of the receiver $d$ is closed by a hinged door $d'$, which is provided with a balance-weight $d^2$ for closing the door and a catch $d^3$ for holding it closed. The door $d'$ is hinged to the receiver on bracket $d^4$, and the weight $d^2$ is carried by side arms $d^5$, while the catch $d^3$ engages with a pin or stud $d^6$ and projects upward above the top of the receiver to $d^7$. Below the receiver $d$ and of such a size that the receiver can oscillate within it during the weighing there is a funnel or chute $e$, with an outlet at $e'$. This funnel is connected to arms $e^2$, which are pivoted on the standards at $e^3$ and carry a balance-weight $e^4$, which normally holds the funnel in the position shown. To one of the side arms $e^3$ there is pivoted the shutter-opening link $e^5$, which is fitted with a truck $e^6$ at its upper end, and its oscillations are limited by a guide $e^7$.

At the top of the machine and bolted to the standards $b$ and $b'$ there is a cross-frame $f$, with a funnel-shaped opening $f'$, which is connected to a hopper or its equivalent. At the sides of the funnel there are short shafts $g$ and $g'$, which have bearings on the funnel sides and on the frame $f$, and there is an inner shutter $h$ and an outer shutter $h'$. The shutter $h$ is fixed to the shaft $g$ and has a bearing which is free to turn on the shaft $g'$, while the shutter $h'$ is fixed to the shaft $g'$ and has a bearing which is free to turn on the shaft $g$, or the outer shutter may have bearings which are free to turn on both shafts. Attached to the shaft $g$, so as to turn with it, there is the inner-shutter-retaining finger $h^2$ and the inner and outer shutter opening lever $h^3$, while at the front of the hopper there a brush $f^2$. At the front of the inner shutter there is a lug $h^{10}$, by which the outer shutter is opened and held open during the first part of the weighing by the inner shutter and its connected mechanism. After the inner shutter has been released the outer shutter is held open by the toggle-levers $h^4$ and $h^5$, which are pivoted together and to the shutter and a fixed center $h^6$, respectively. The center $h^6$ is carried by a bracket $h^7$ from the hopper-frame $f$, and there is a stop $h^8$ for limiting the backward movement of the levers, and an arm $h^9$, which projects toward the front of the machine and is acted upon to release the shutter by a pin $a^6$ on the beam itself. The action of the levers $h^4$ and $h^5$ is shown more particularly in Figs. 5 and 6. The axle 1 is fixed to the shutter $h'$, the axle 2 to the link $h^4$, and the axle 3 to the bracket $h^7$, and all the axles are loosely fitted in the holes in the links, so as to play freely or have a certain lost motion therein. In Fig. 5 both shutters are shown open, the outer shutter being held open by the lug $h^{10}$ on the inner shutter, while the links $h^4$ and $h^5$ simply hang on the axle 1 without supporting the shutter $h'$. When, however, the inner shutter is released and falls to the position shown in Fig. 6, the outer shutter falls until its weight is brought upon and is supported by the links $h^4$ and $h^5$. The inner-shutter finger $h^2$ works in conjunction with a claw-lever $a^3$, which is pivoted upon the beam at $a^4$ and has a weighted arm $a^5$ for holding it in position to engage with the finger $h^2$. Pivoted on the outer shutter there is a finger $l$, so arranged that when the shutter falls to close the funnel this finger strikes the catch $d^3$ and moves it clear of its pin $d^6$, so that the door $d'$ can then be opened. There is also a hand-lever $f^3$, by which the catch $d^3$ can be operated if it is desired to work the machine semi-automatically, the finger $l$ being first turned backward on its carrying-axle. The front edge of the inner shutter is made with recesses or slots 3, (see Fig. 10,) so that when it falls the funnel is only partially closed, and the material flows or "sprinkles" through these recesses until the weighing is completed.

At the back of the machine there is a weighted lever $k$, which is free to turn on a fixed axle $k'$ and acts upon the beam $a$ during the first part of the weighing process through a lug $c^2$ on the scale-pan arm. This lever $k$ is made with a number of pivot-holes $k^2$, so that its action on the beam can be varied, and there is a stop $k^4$ for limiting the action of the lever $k$ upon the beam.

The beam $a$ at each of the usual points is fitted with a balancing-center $x$, which works in conjunction with a pan $t$. In addition to this center the beam is at each or any of these centers fitted with a wedge-shaped piece $u$, and the corresponding pan has a similarly-shaped recess $v$, the parts being so arranged that when the beam is on the balance the wedge $u$ is clear of the recess $v$, as shown in Figs. 7 and 8; but when the beam is moved to one of its extreme positions, as in Fig. 9, the wedge $u$ comes into contact with the recess $v$, and the pan and the center, with their connected parts, are returned to or maintained in their correct positions relatively to each other. This form of center may be applied to the beam main centers or to the centers of parts which swing upon the beam.

When the machine is to be used for weighing material into sacks, the front end of the beam $a$ is fitted with a sack-trunk $p$, Fig. 4, to which the sack $p'$ is fastened by a clip $p^2$ of the usual construction, while the receiver $d$ and funnel $e$, with their connected parts, are removed. The hopper, shutters, and other parts are the same as on the machine already described with reference to Figs. 1, 2, and 3 and are indicated in Fig. 4 by the same reference-letters.

When the sack-weighing machine is to be used for flour and other powdered materials, the upper part of the machine is preferably inclosed in a casing $r$, which has a gauze, canvas, or similar covering at the top $s$. The material is fed by a worm $q$, and as it falls into the sack the air forced out of the sack escapes through the canvas top $s$, which prevents the escape of the dust.

For testing the accuracy of the balance of the improved machine the weights are removed from the scale-pan and the compensating weights $d^{10}$ from the arm $d^9$ on the receiver. The beam should then be horizontal, as indicated by the pointer; but if not weights are added to or removed from the scale-pan. The accuracy of the weighing is tested by turning the finger $l$ on its axle, so that it does not act upon the catch $d^3$, and after the receiver has been charged the compensating weights are removed and the beam should balance; but if it does not the compensation-weights are altered and other charges are weighed until a perfect balance is obtained.

When the machine herein described is in active operation, the receiver $d$ is in its highest position at the commencement of each weighing, and the beam is then being acted upon by the lever $k$. Both shutters are wide open, and the material flows through the funnel into the receiver, causing it to gradually descend. The beam is thereby actuated, and the claw end of the lever $a^3$ is moved below the end of the finger $h^2$, and the inner shutter is liberated, at which time the lug $c^2$ is about clear of the lever $k$. The material then flows more slowly through the openings in the edge of the inner shutter until the desired quantity of material has passed the funnel $f'$, at which time the beam is in equilibrium, and the pin $a^6$ comes into contact with the arm $h^9$ to liberate the outer shutter, which then falls and completely closes the funnel $f'$. When this occurs, there is a certain amount of material in suspension which has left the hopper, but has not been weighed, and such material is of the same weight as the compensating weights on the arm $d^9$. The movement of the outer shutter brings the finger $l$ into contact with the catch $d^3$, which is pushed off its catch-pin $d^6$, and the door $d'$ is then opened by the material in the receiver. This allows the material to fall into the funnel $e$, which is lowered and carries the truck $e^6$ below the end of the shutter-opening lever $h^3$. After the receiver has emptied itself its door $d'$ is closed by the balance-weight $d^2$, the catch $d^3$ rises into position to engage with its pin $d^6$ when the shutters are opened, and the receiver rises to its highest position. In the meantime the material has been flowing out of the funnel $e$, and when this is empty it is raised to its normal position by the balance-weight $e^4$, the truck $e^6$ then acting upon the lever $h^3$, by which both the shutters are opened, the means already described holding them in their open position for the succeeding weighing. The action of the sack-weighing machine is similar to the action of the machine already described; but as the full sack has to be replaced by an empty sack at each weighing the shutter-opening mechanism is unnecessary and the shutters are opened by hand through a handle $w$.

Having now described how my invention is to be performed, what I claim, and desire to protect by Letters Patent of the United States, is—

1. In a weighing-machine the combination of an equal-armed beam, a weight-pan pivoted at one end of the beam, a receiver pivoted at the other end of the beam, a counterbalanced door for normally maintaining the lower end of the receiver closed, a catch for locking the door in its closed position, a pivoted funnel below the receiver, a fixed funnel above the receiver, the inner and outer shutters for closing the upper funnel, a pivoted finger carried by the outer shutter and arranged to release the said catch when the shutter is closed, the shutter-retaining mechanism, and the shutter-releasing mechanism and means actuated by the upward movement of the pivoted funnel for opening the shutters substantially as herein described.

2. In a weighing-machine the combination of an equal-armed beam, a weight-pan and receiver at opposite ends of the beam, the beam-centers, a hinged door at the bottom of the receiver, a catch for holding closed the receiver-door, the pivoted funnel below the receiver, the fixed funnel above the receiver, the inner shutter with its recesses for partially closing the fixed funnel the outer shutter for completely closing the fixed funnel, the brush at the front of the fixed funnel, the retaining and releasing mechanisms for the shutters, the lever acting upon the beam during the early part of the weighing, the compensation-weights and means actuated by the upward movement of the pivoted funnel for opening the shutters substantially as herein described.

3. In a weighing-machine the combination of an equal-armed beam, a weight-pan and receiver, the beam-centers, the receiver-door, the catch for the said door, the pivoted funnel with its balance-weight below the receiver, the fixed funnel, the inner shutter for partially closing the said funnel, the brush in front of the funnel, the shaft to which the inner shutter is fixed, the inner-shutter-retaining finger, the claw-lever pivoted on the beam for engaging the said finger, the shutter-opening lever, the lug on the inner shutter for opening the inner shutter, the outer shutter for completely closing the fixed funnel the outer-shutter toggle-levers and the weighted lever acting upon the back end of the beam substantially as herein described.

4. In a weighing-machine the combination of an equal-armed beam, a weight-pan and receiver, the beam-centers, the receiver-door, the catch for the said door, the pivoted funnel with its balance-weight below the receiver, the fixed funnel, the inner shutter for partially closing the said funnel, the brush in front of the funnel, the shaft to which the inner shutter is fixed, the second shaft on which the shutter is free, the inner-shutter-retaining finger, the claw-lever pivoted on the beam, the shutter-opening lever, the lug at the front of the inner shutter, the outer shutter, the toggle-lever pivoted thereto, the second toggle-lever, the fixed center for the toggle-levers, the releasing-arm attached to the toggle-levers, the releasing-pin on the beam, the shutter-opening link connected to the pivoted funnel the weighted lever acting on the back end of the beam and the compensating weights substantially as herein described.

5. In a weighing-machine the combination of an equal-armed beam, the weight-pan and receiver pivoted thereto, the beam balancing-centers, the cross center-pieces, the fixed and pivoted funnels, the inner and outer shutters, the retaining and releasing mechanisms for the shutters, the lever acting upon the back end of the beam, the compensating weights, and means actuated by the upward movement of the pivoted funnel for opening the shutters substantially as herein described.

6. In a weighing-machine the combination of an equal-armed beam, the beam balancing-centers, the cross center-pieces, the pivoted weight-pan, the pivoted receiver, the receiver-door and its catch, the catch-releasing finger on the outer shutter, the catch-releasing hand-lever, the fixed funnel, the brush in front of the same, the shutter-shafts, the inner shutter, the inner-shutter-retaining finger, the pivoted claw-lever, the shutter-opening lever, the shutter-opening link, the lug at the front of the inner shutter, the outer shutter, the shutter-retaining toggle-levers, the fixed center for the said levers, the shutter-releasing arm and pin, the pivoted funnel, the balance-weight for the said funnel, the lever for the back end of the beam the compensating weights and the indicator or pointer substantially as herein described.

In testimony whereof I have signed my name to this specification in the presence of two subscribing witnesses.

FRANZ WERTENBRUCH.

Witnesses:
JNO. M. GADZEAN,
HENRY LAING.